(12) United States Patent
Robert Jose

(10) Patent No.: US 11,785,288 B2
(45) Date of Patent: *Oct. 10, 2023

(54) SYSTEMS AND METHODS TO HANDLE QUERIES COMPRISING A MEDIA QUOTE

(71) Applicant: Rovi Guides, Inc., San Jose, CA (US)

(72) Inventor: Jeffry Copps Robert Jose, Tamil Nadu (IN)

(73) Assignee: ROVI GUIDES, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/675,165

(22) Filed: Feb. 18, 2022

(65) Prior Publication Data

US 2022/0279238 A1   Sep. 1, 2022

Related U.S. Application Data

(63) Continuation of application No. 17/116,373, filed on Dec. 9, 2020, now Pat. No. 11,290,773.

(51) Int. Cl.
| | |
|---|---|
| *H04N 21/439* | (2011.01) |
| *H04N 21/81* | (2011.01) |
| *H04N 21/84* | (2011.01) |
| *G06F 16/783* | (2019.01) |
| *G06F 16/432* | (2019.01) |

(52) U.S. Cl.
CPC ....... *H04N 21/4394* (2013.01); *G06F 16/433* (2019.01); *G06F 16/7834* (2019.01); *H04N 21/8113* (2013.01); *H04N 21/84* (2013.01)

(58) Field of Classification Search
CPC .......... H04N 21/4394; H04N 21/8113; H04N 21/84; H04N 21/233; H04N 21/25; H04N 21/41407; H04N 21/42203; H04N 21/472; H04N 21/8352; G06F 16/433; G06F 16/7834

See application file for complete search history.

(56) References Cited

U.S. PATENT DOCUMENTS

| | | | |
|---|---|---|---|
| 8,132,103 B1* | 3/2012 | Chowdhury | G06F 16/7834 715/725 |
| 2010/0138411 A1* | 6/2010 | Judy | G06F 16/433 707/723 |
| 2015/0363481 A1* | 12/2015 | Haynes | G06Q 10/10 707/748 |
| 2017/0339463 A1* | 11/2017 | Pike | H04N 21/25 |
| 2017/0347142 A1* | 11/2017 | Tang | H04N 21/25883 |

* cited by examiner

*Primary Examiner* — Alazar Tilahun
(74) *Attorney, Agent, or Firm* — HALEY GUILIANO LLP

(57) ABSTRACT

Systems and methods for handling a query comprising a media quote are provided. One example method includes receiving, at a computing device, an input comprising a query. A media quote is identified based on the query. A media asset is identified based on the identified media quote. An action is performed at the computing device, the action based on the identified media asset.

20 Claims, 8 Drawing Sheets

SYSTEMS AND METHODS TO HANDLE QUERIES COMPRISING A MEDIA QUOTE

CROSS-REFERENCE TO RELATED APPLICATION

This patent application is a continuation of U.S. patent application Ser. No. 17/116,373, filed Dec. 9, 2020, the disclosure of which is hereby incorporated by reference herein in its entirety.

BACKGROUND

The disclosure relates to handling queries comprising a media quote and, in particular, systems and related methods for identifying a media asset based on an identified media quote.

SUMMARY

With the proliferation of smart TVs and other smart devices, there has been an increase in the use of computing devices that allow users to interact with them via natural language queries. Devices are often prefixed with "smart" to indicate that they are connectable to a network (such as the internet and/or a home network) and are capable of issuing and/or receiving commands via the network. A typical natural language query may be a user instructing their smart TV to "Play 'Community.'" The user would expect their smart TV to interpret the query and play the TV show "Community." However, there are some scenarios where a user may not be able to remember the title of a media asset, but they may remember a quote from the media asset. For example, a user may remember the quote "May the Force be with you," but not remember the film that it is from. A user may wish to play a media asset by referring to a quote from the media asset, instead of the title. In a similar example, a user may want to issue a command to their smart speaker to play a song and may remember a lyric (i.e., a specific type of quote) from a song, but not the title of the song itself. In such a scenario, it may be beneficial to the user to be able to play the song by referring to a lyric from the song rather than the song title. Typically, when a smart device responds to a query, different parts of the query are matched to different entities that are stored in, for example, a database or a knowledge graph. A learned template may also be applied to the query to aid with the query structure. In an example, the database may comprise actions, such as "play," "stop," and/or "fast-forward," and data categories for media assets, such as the titles of movies, TV shows and/or songs. In this way, the system is able to refer to the database to help interpret a natural language query and perform an action with respect to a media asset. However, in order to enable a smart device to respond to a query comprising a quote, it is not straightforward to simply include an additional "quote" data category in the database, not least because a media asset may have dozens, if not hundreds, of quotes associated with it, and the database may comprise data entries for many thousands of media assets. If the quotes for each media asset were simply added to the database, then it is likely that the size of the database index would grow drastically, and it may be more difficult for a smart device to utilize such a database when responding to a natural language query, not least because a smart device may have a relatively low amount of computing power available to it and/or a limited amount of network bandwidth available to it.

In view of the foregoing, it would be beneficial to have a system for efficiently handling a query comprising a media quote.

Systems and methods are described herein for handling a query comprising a media quote. In accordance with an aspect of the disclosure, a method is provided for handling a query comprising a media quote. An input comprising a query, wherein the query comprises a media quote, is received at a computing device. A media quote is identified from the query. A media asset is identified based on media quote. An action is performed at the computing device based on the identified media asset.

An example of such a method is described in connection with a user interacting with a smart TV. In this example, the user verbally instructs their smart TV to play the film of "May the Force be with you." The smart TV receives the query. The media quote in the query is identified, and the film "Star Wars: The Force Awakens" identified. The smart TV plays back the film "Star Wars: The Force Awakens."

The method may further include chunking the query to produce one or more chunks. A hash for each chunk may be generated, thereby producing one or more hashes. Whether the one or more hashes are present in an index of media assets may be identified. Where the one or more hashes are present in the index of media assets, an indication of the media asset associated with the one or more hashes may be returned.

The method may further include enabling the computing device to communicate with a server, and at least one of the processing, the media quote and/or identifying the media asset may be performed at a server. The input may be spoken input and/or text input. The computing device may be, for example, a mobile device, a smart speaker, a smart television or a smart set-top box. The media asset may be, for example, a film or a song.

In accordance with a second aspect of the disclosure, a method is provided for generating an index of media assets. Source media asset data is provided, wherein the source media asset data comprises data associated with at least one media asset, the data comprising one or more words. The source media asset data is indexed to produce an index of media assets. Source quote data is provided, wherein the source quote data comprises one or more quotes associated with at least one media asset, each quote comprising one or more words. Identifying whether the quote is associated with a media asset in the media asset data, for each quote in the source quote data. Where a quote is associated with a media asset, identifying whether there are one or more common words between the media asset data associated with the media asset and the quote. Where there are one or more common words between the media asset data and the quote, one or more phrases associated with the quote are identified based on the quote, hashes for the quote and the one or more phrases are generated, and, in the index of media assets, the hashes for the quote and the one or more phrases are associated with the media asset.

The method may further include chunking the query to produce one or more chunks. A hash for each chunk may be generated. Whether the hash is present in an index of media assets may be identified, and wherein the index is generated in accordance with the second aspect of the disclosure. Where the hash is present in the index of media assets, an indication of the media asset associated with the hash may be returned.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which.

DETAILED DESCRIPTION

Systems and methods are described herein for handling a query comprising a media quote. As referred to herein, a computing device can be any device comprising a processor and memory, for example, a television, a Smart TV, a set-top box, integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smart speaker or any other television equipment, computing equipment, or wireless device, and/or combination of the same.

As referred to herein, a media asset may be a video, such as a movie and/or TV show, audio, such as a song, an e-book and/or any combination of these. A media quote may be one or more words from a media asset including lyrics of a song.

As referred to herein, a network is any network on which computing devices can communicate. This includes wired and wireless networks. It also includes intranets, the internet and/or any combination of the two.

As referred to herein, a hash is a fixed-size value generated by a hash function. A hash function is a function that is used to map data of an arbitrary size to the fixed-size hash function. Typically, a hash is an alphanumeric value, but can be a numeric or alphabetical value. Examples of hash functions include MD5 and SHA256.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

Figure 1:
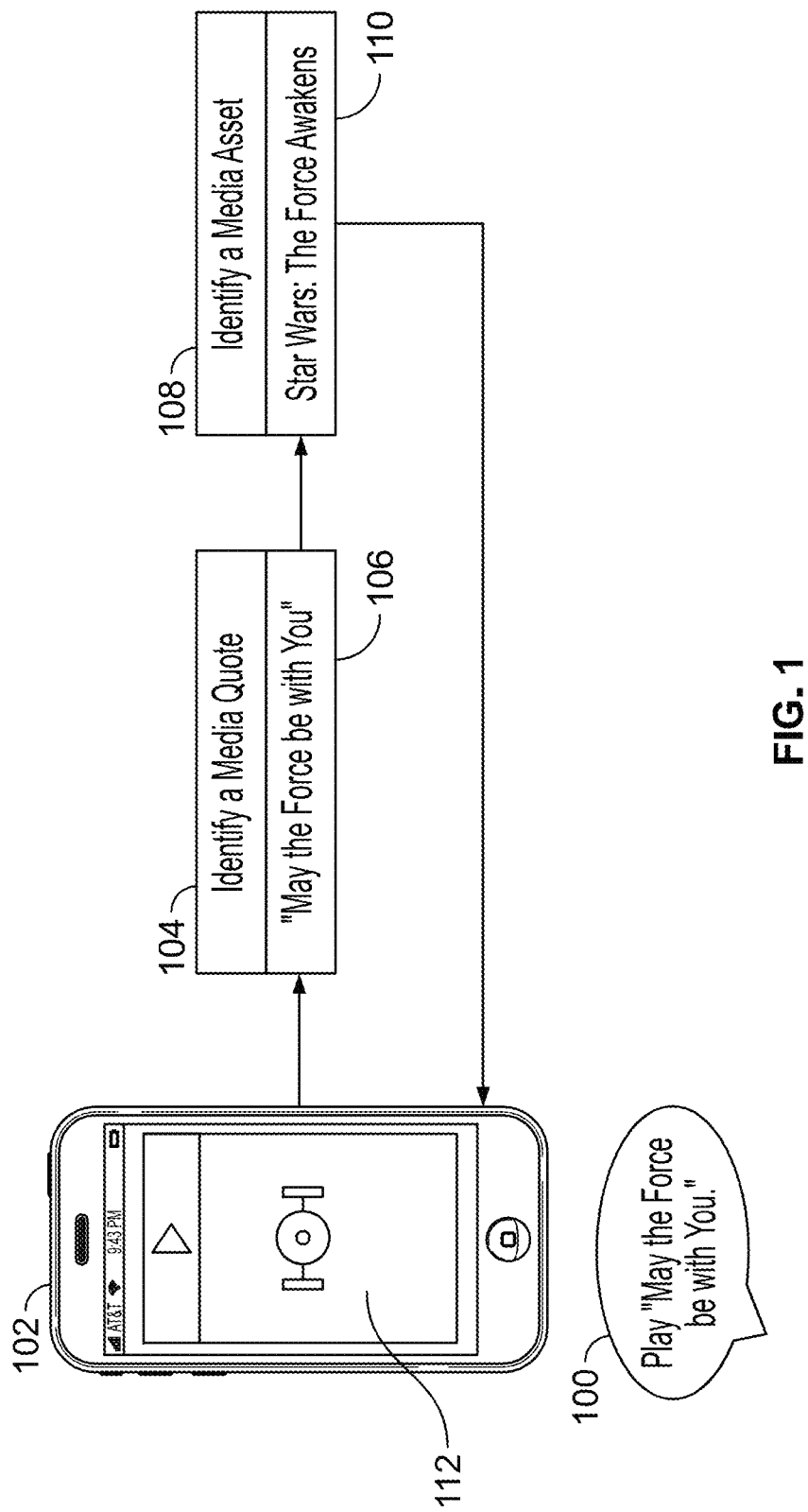
FIG. 1 shows an exemplary environment in which a query comprising a media quote is handled, in accordance with some embodiments of the disclosure.

FIG. 1 shows an exemplary environment in which a query comprising a media quote is handled, in accordance with some embodiments of the disclosure. A user provides verbal input 100 comprising a query at a mobile device 102. In this example, the query is "Play 'May the Force be with you.'" In other examples, the input may be a text input via, for example, a keyboard. Additionally, although in this example the quote is from a movie, the quote may be from any media asset, such as a song or an e-book. The mobile device 102 receives the verbal input 100 via a microphone and processes the query. The mobile device 102 may process the query using Natural Language Understanding (NLU). Once the query is processed, the mobile device 102 identifies a media quote 104 in the query. In this example, the quote is "May the Force be with you" 106. The mobile device 102 also identifies the command associated with the query (i.e., "Play"). The mobile device 102 identifies a media asset 108 associated with the quote. In this example, the media asset is the movie "Star Wars: The Force Awakens" 110. Once the mobile device 102 has processed the query, the mobile device 102 performs an action based on the query. In this example, the mobile device 102 plays the movie "Star Wars: The Force Awakens" 112. The mobile device 102 may play the movie via a file stored on the mobile device. In another example, the mobile device 102 may connect to a server via, for example, the internet and stream the movie from the server. In this way, a user is able to provide a request directed towards a media asset, even if they do not know the title of the media asset.

Figure 2:
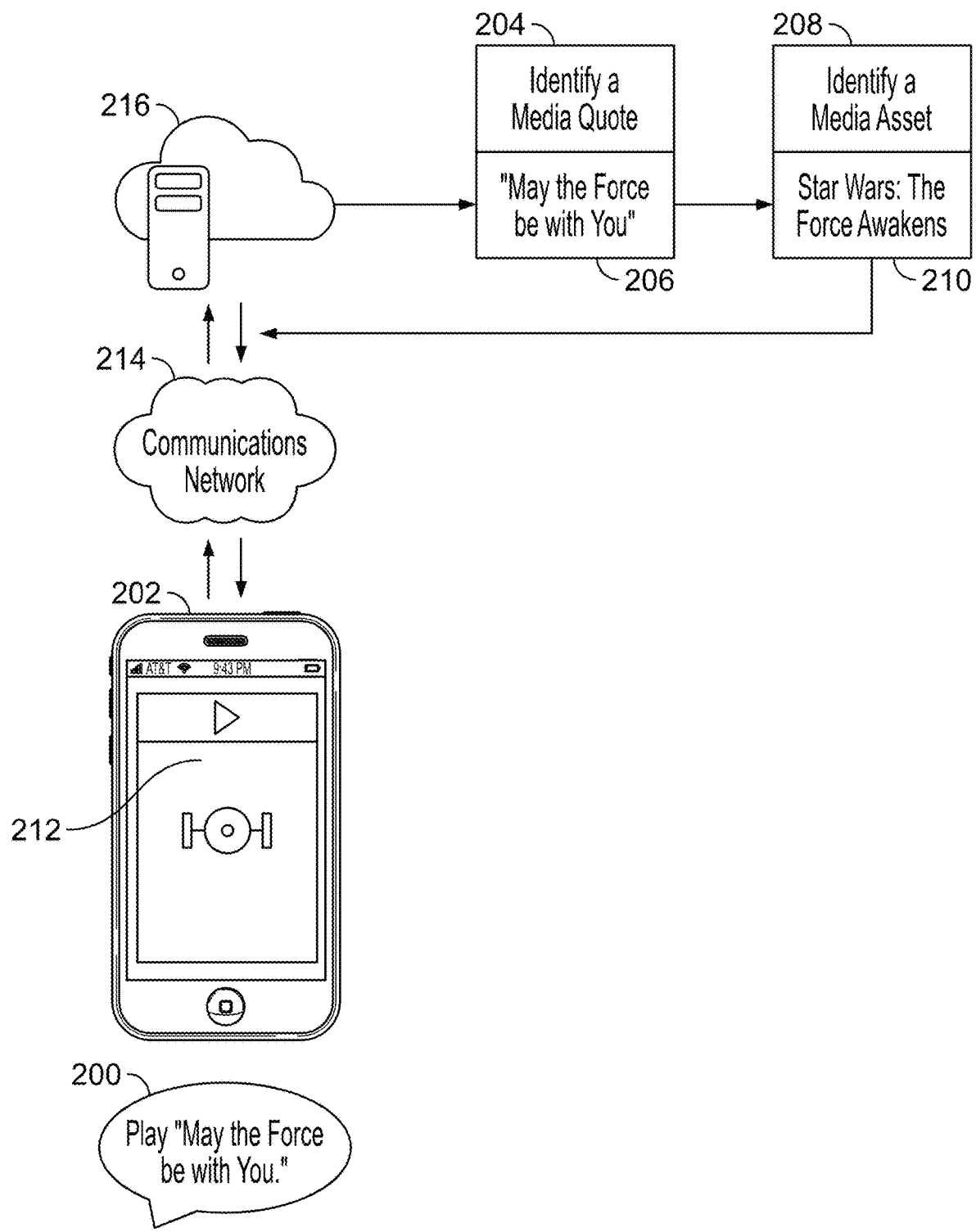
FIG. 2 shows an exemplary environment in which a query comprising a media quote is handled, in accordance with some embodiments of the disclosure.

FIG. 2 shows an exemplary environment in which a query comprising a media quote is handled, in accordance with some embodiments of the disclosure. In a similar manner to the environment of FIG. 1, a user provides verbal input 200 comprising a query at a mobile device 202. In this example, the query is "Play 'May the Force be with you.'" In other examples, the input may be a text input via, for example, a keyboard. Additionally, although in this example the quote is from a movie, the quote may be from any media asset, such as a song or an e-book. The mobile device 202 receives the verbal input 200 via a microphone and transmits the query, via a communications network 214 (e.g., the internet), to a server 216. The query is processed at the server 216. The server 216 may process the query using NLU. Once the query is processed, the server 216 identifies a media quote 204 in the query 200. In this example, the quote is "May the Force be with you" 206. The server 216 also identifies the command associated with the query (i.e., "Play"). The server 216 identifies a media asset 208 associated with the quote. In this example, the media asset is the movie "Star Wars: The Force Awakens" 210. Once the server 216 has processed the query, server 216 transmits output of the processing, via the communications network 214, to the mobile device 202. Once the mobile device 202 has received the output from the server 216, the mobile device 202 performs an action based on the query. In this example, the mobile device 202 plays the movie "Star Wars: The Force Awakens" 212. The mobile device 202 may play the movie via a file stored on the mobile device. In another example, the mobile device 202 may connect to a server via, for example, the internet and stream the movie from the server. In this way, a user is able to provide a request directed towards a media asset, even if they do not know the title of the media asset.

In order to identify a quote and a media asset from the quote, a database is queried. If a user provides a straightforward query, such as "Play 'Star Wars: The Force Awakens,'" a database that comprises a plurality of media assets, for example, a database comprising movie titles, can be queried. The database may also include titles that the movie is known by, for example, "The Adventures of Sherlock Holmes," may also have an associated entry for "Sherlock Holmes." The media asset titles and known by titles are chunked, (i.e., split into smaller words and/or phrases), and the chunks are stored in the database and are associated with the movie title. For example, the movie title "Star Wars: The Force Awakens," may have chunks such as "Star Wars: The Force Awakens," "Star Wars," "The Force Awakens," "Force Awakens" and "Force" associated with it. A hash of these chunks is generated and is stored in the database. When a user provides an input query, the input query is chunked and hashed in a similar manner, and the database is queried with these chunks in order to determine a movie title in the input query.

In order to enable a user to provide a query comprising media quotes, the database needs to be constructed such that it can be queried for media quotes as well as media titles. However, a media asset may comprise many quotes, so, in order to avoid an excessively large database index, the database is constructed in the following manner. One or more sources of media quotes that identify the quotes with a title of a media asset are identified. The media quotes and the titles of the media assets are analysed to identify overlap. For example, the quote "May the Force be with you" and the movie title "Star Wars: The Force Awakens" overlap via the word "force." In this example, this quote and movie title would be processed as discussed below and included in the database. However, the quote "Elementary, my dear Watson" and the movie title "The Adventures of Sherlock Holmes" do not overlap and would not be processed further. Although the database may include the movie title "The Adventures of Sherlock Holmes," in this example, the quote "Elementary, my dear Watson" would not be included. For the quotes that are to be included in the database, a hash of the quote is generated. These quote hashes are stored in the database and are associated with the hash of the chunks that overlap with the quote. For example, the hashes for "Star Wars: The Force Awakens," "The Force Awakens," "Force Awakens" and "Force" would have the hash for "May the Force be with you" associated with them. In this way, when an overlapping word (e.g., "force") is identified in an input query, a quote can be resolved in addition to the movie title.

In another example, the quote "Welcome to Jurassic World" and the movie titles "Jurassic Park," "The Lost World: Jurassic Park" and "Jurassic World" all overlap via one or more common words. In this example, the hashes for "Jurassic Park," "Jurassic," "The Lost World," "The Lost Word Jurassic Park" and "Jurassic World" would have the hash for "Welcome to Jurassic World" associated with them. In this way, when an overlapping word or words (e.g., "Jurassic," or "Jurassic World") is/are identified in an input query, a quote can be resolved in addition to the movie title.

Figure 3A:
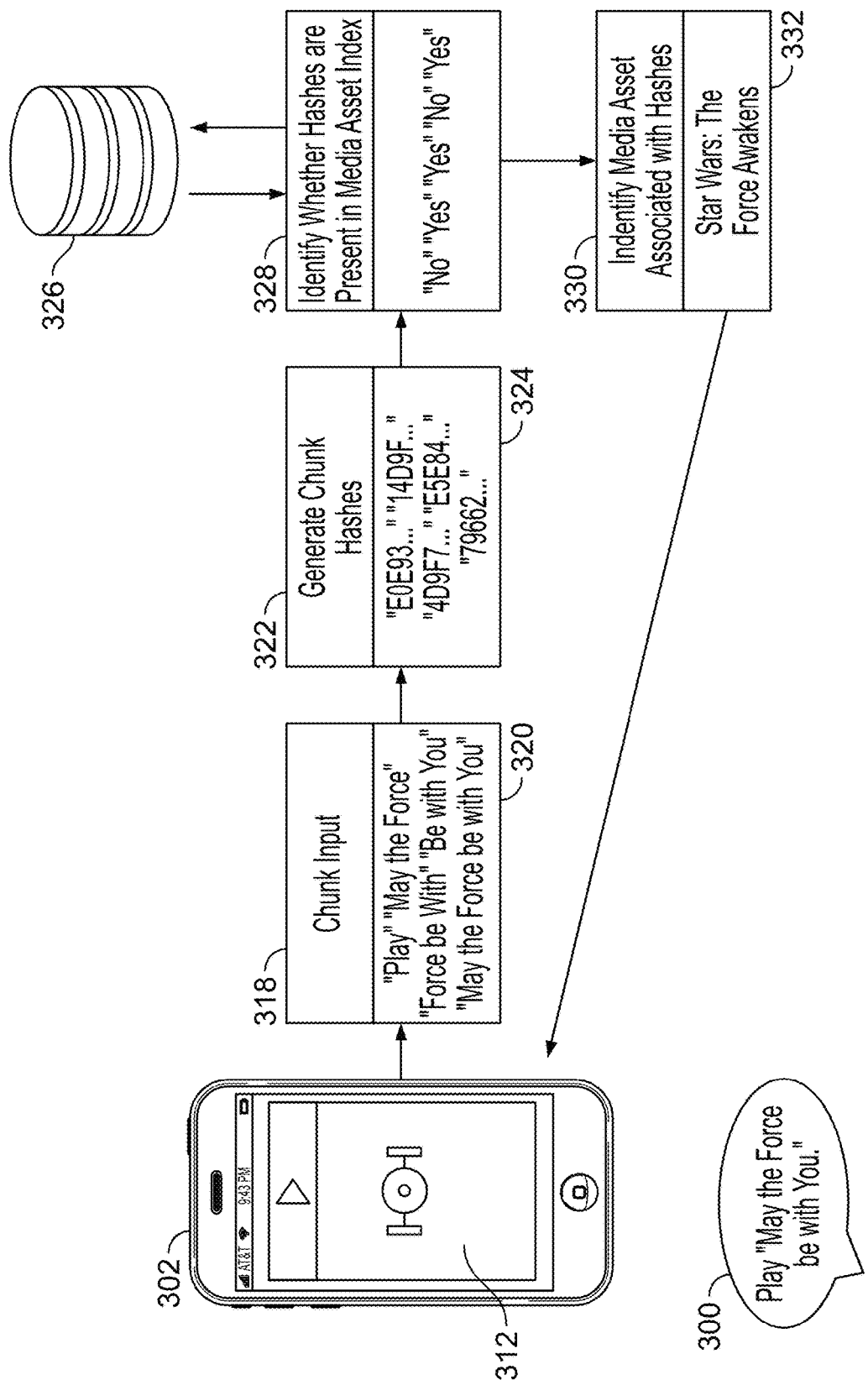
FIG. 3A shows an exemplary environment in which a query comprising a media quote is handled, in accordance with some embodiments of the disclosure.

FIG. 3A shows an exemplary environment in which a query comprising a media quote is handled, in accordance with some embodiments of the disclosure. A user provides verbal input 300 comprising a query at a mobile device 302. In this example, the query is "Play 'May the Force be with you.'" In other examples, the input may be a text input via, for example, a keyboard. Additionally, although in this example the quote is from a movie, the quote may be from any media asset, such as a song or an e-book. The mobile device 302 receives the verbal input 300 via a microphone and transmits the query, via a communications network 314 (e.g., the internet), to a server 316. The query is processed at the server 316. The server 316 chunks the query 318 to produce a plurality of chunks 320. Before chunking, the server 316 may determine whether the phrases involved in the input query have phonetic and lexical variants, for example, via algorithms such as Soundex and Lexical normalizations. If there are phonetic and lexical variants, these variants may also be chunked. The chunking may employ different strategies such as N-Gram, Skip gram, and/or Edge gram lookups. Once the chunks have been generated, the chunks are hashed 322 to produce a plurality of chunk hashes 324. Any known hashing algorithm may be used. A database of media asset indexes, such as the database discussed above, is queried to identify whether the chunk hashes are present 328, and a media asset associated with the hashes is identified 330. As discussed above, because the hashes of the movie quote are associated with the chunked media title hashes in the database, the quote resolves to the media asset title. In this example, the media asset is "Star Wars: The Force Awakens." Once the mobile device 302 has processed the query, the mobile device 302 performs an action based on the query. In this example, the mobile device 302 plays the movie "Star Wars: The Force Awakens" 312. The mobile device 302 may play the movie via a file stored on the mobile device. In another example, the mobile device 302 may connect to a server via, for example, the internet and stream the movie from the server. In this way, a user is able to provide a request directed towards a media asset, even if they do not know the title of the media asset.

Figure 3B:
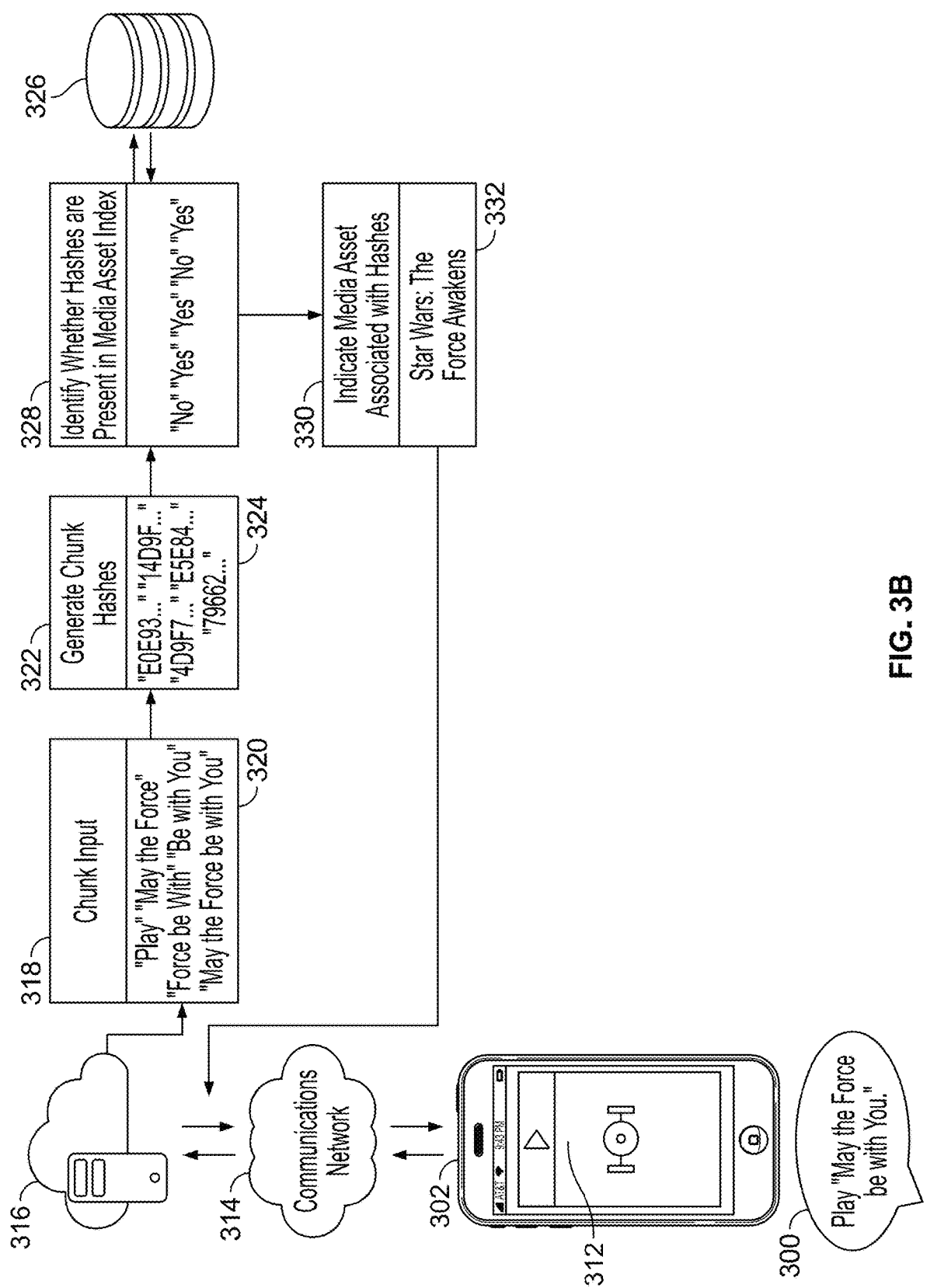
FIG. 3B shows an exemplary environment in which a query comprising a media quote is handled, in accordance with some embodiments of the disclosure.

FIG. 3B shows an exemplary environment in which a query comprising a media quote is handled, in accordance with some embodiments of the disclosure. In a manner similar to the exemplary environment shown in FIG. 3A, a user provides verbal input 300 comprising a query at a mobile device 302. In this example, the query is "Play "May the Force be with you"." In other examples, the input may be a text input via, for example, a keyboard. Additionally, although in this example the quote is from a movie, the quote may be from any media asset, such as a song or an e-book. The mobile device 302 receives the verbal input 300 via a microphone and processes the input. The mobile device 302 chunks the query 318 to produce a plurality of chunks 320. Before chunking, the mobile device 302 may determine whether the phrases involved in the input query have phonetic and lexical variants, for example, via algorithms such as Soundex and Lexical normalizations. If there are phonetic and lexical variants, these variants may also be chunked. The chunking may employ different strategies such as N-Gram, Skip gram, and/or Edge gram look ups. Once the chunks have been generated, the chunks are hashed 322 to produce a plurality of chunk hashes 324. Any known hashing algorithm may be used. A database of media asset indexes, such as the database discussed above, is queried to identify whether the chunk hashes are present 328 and a media asset associated with the hashes is identified 330. As discussed above, because the hashes of the movie quote are associated with the chunked media title hashes in the database, the quote resolves to the media asset title. In this example, the media asset is "Star Wars: The Force Awakens." Once the server 316 has processed the query, server 316 transmits output of the processing, via the communications network 314, to the mobile device 302. Once the mobile device 302 has received the output from the server 316, mobile device 302 performs an action based on the query. In this example, the mobile device 302 plays the movie "Star Wars: The Force Awakens" 312. The mobile device 302 may play the movie via a file stored on the mobile device. In another example, the mobile device 302 may connect to a server via, for example, the internet and stream the movie from the server. In this way, a user is able to provide a request directed towards a media asset, even if they do not know the title of the media asset.

Figure 4:
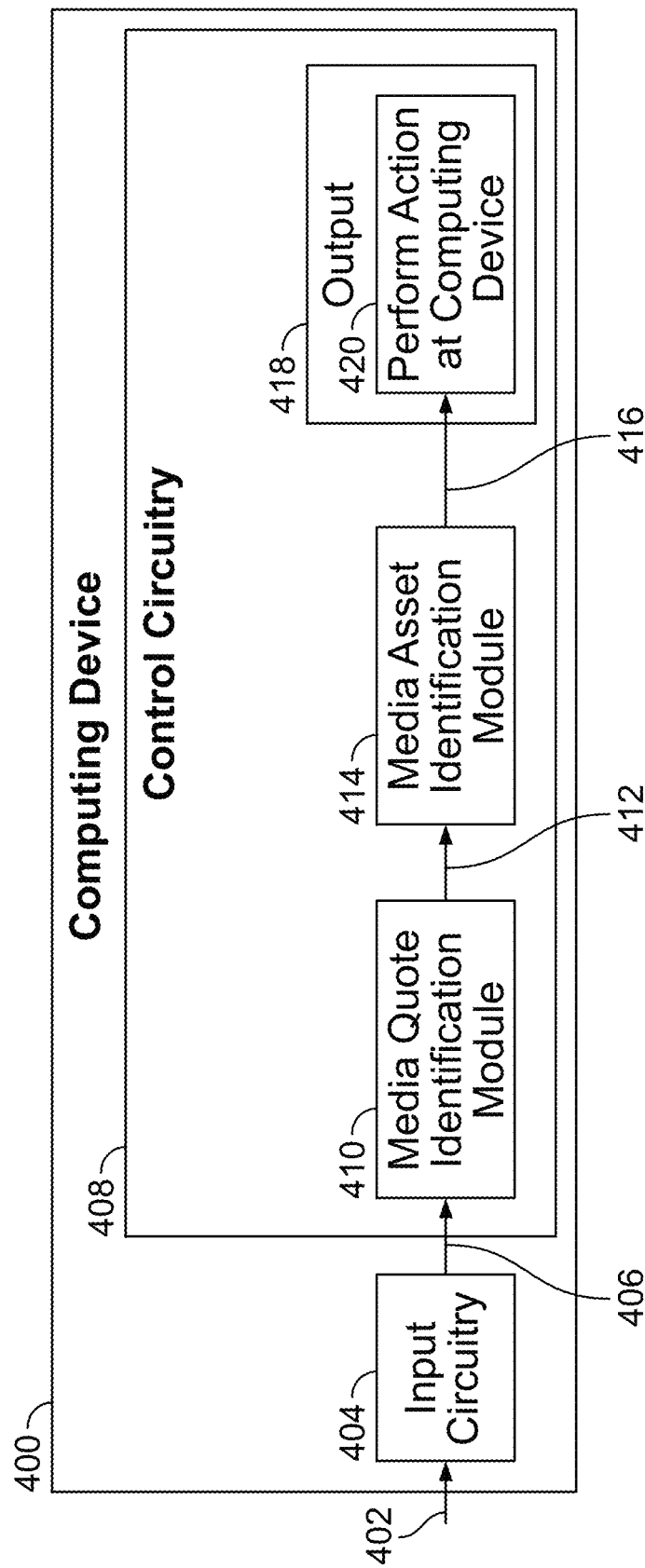
FIG. 4 shows a block diagram representing components of a computing device and data flow therebetween for handling a query comprising a media quote, in accordance with some embodiments of the disclosure.

FIG. 4 is a block diagram representing components of a computing device and data flow therebetween for handling a query comprising a media quote, in accordance with some embodiments of the disclosure. Computing device 400 (e.g., a mobile device 102, 202, 302 as discussed in connection with FIGS. 1-3) comprises input circuitry 404, control circuitry 408 and an output module 418. Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A user provides an input 402 that is received by the input circuitry 404. Transmission of the input 402 from the input device to the input circuitry 404 may be accomplished via a microphone and/or a keyboard. The input may be verbal input, or it may be tactile input. The verbal input may be received by an integral microphone of a computing device or it may be received by an external microphone that is connected to a computing device by wired or wireless, for example BLUETOOTH, means. Tactile input includes, for example, input provided via buttons or a touchscreen at the computing device or via a keyboard and/or mouse connected to the computing device, for example via BLUETOOTH or a USB cable. The input circuitry 404 transmits 406 the user input to the control circuitry 408.

The control circuitry 408 comprises a media quote identification module 410, a media asset identification module 414 and an output module 418. The user input is transmitted to the media quote identification module 410. The identified media quote is transmitted 412 to the media asset identification module 414 where, based on the media quote, a media asset is identified. The identified media asset is transmitted 416 to the output module 418. At 420 an action, based on the identified media asset, is performed at the computing device.

Figure 5:
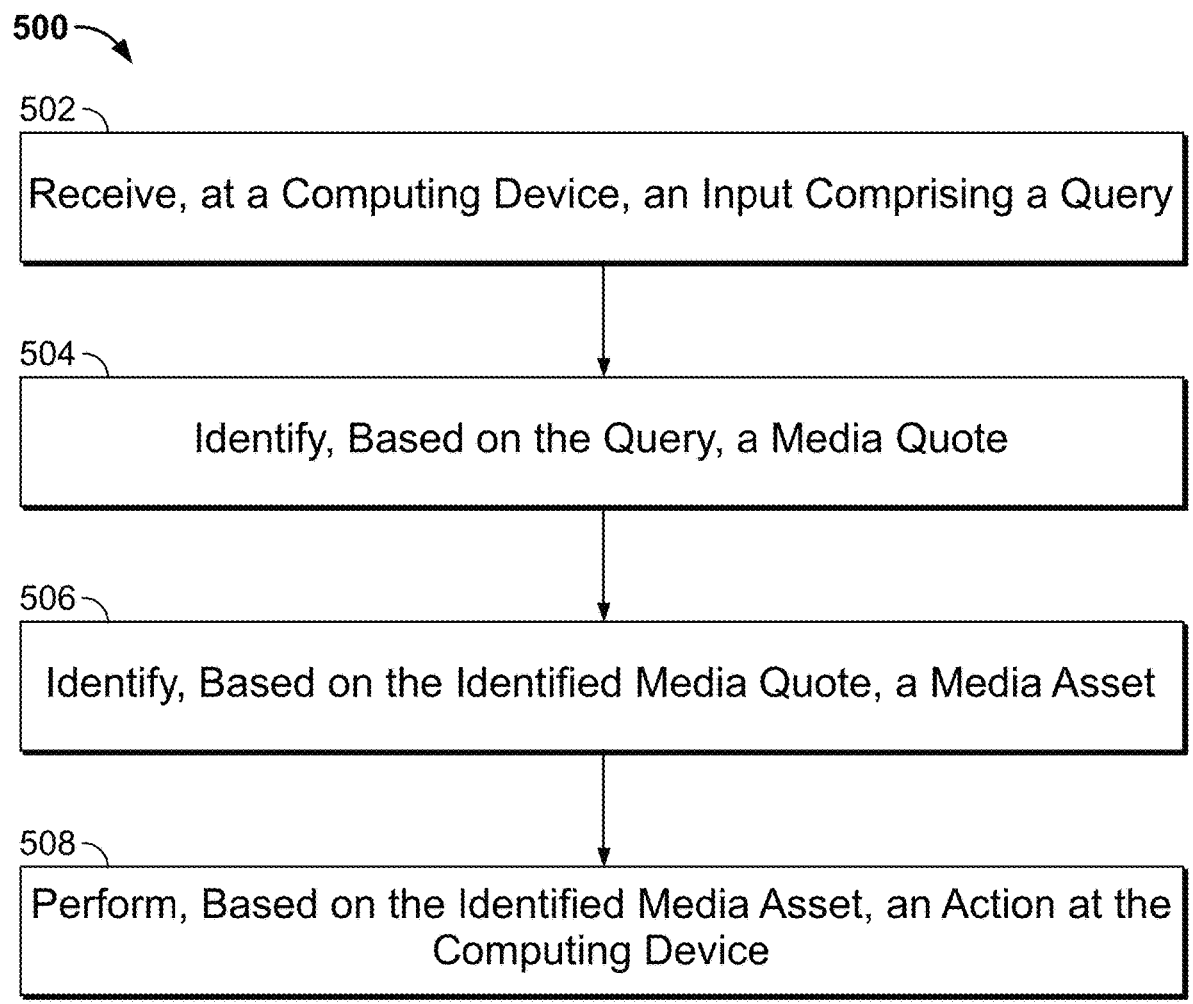
FIG. 5 is a flowchart representing a process for handling a query comprising a media quote, in accordance with some embodiments of the disclosure.

FIG. 5 is a flowchart representing a process for handling a query comprising a media quote, in accordance with some embodiments of the disclosure. Process 500 may be implemented on any aforementioned computing device 102, 202, 302. In addition, one or more actions of process 500 may be incorporated into or combined with one or more actions of any other process or embodiment described herein.

At 502, an input comprising a query is received at a computing device. At 504 a media quote is identified based on the query. At 506, a media asset is identified based on the identified media quote. At 508, an action is performed at the computing device based on the identified media asset.

Figure 6:
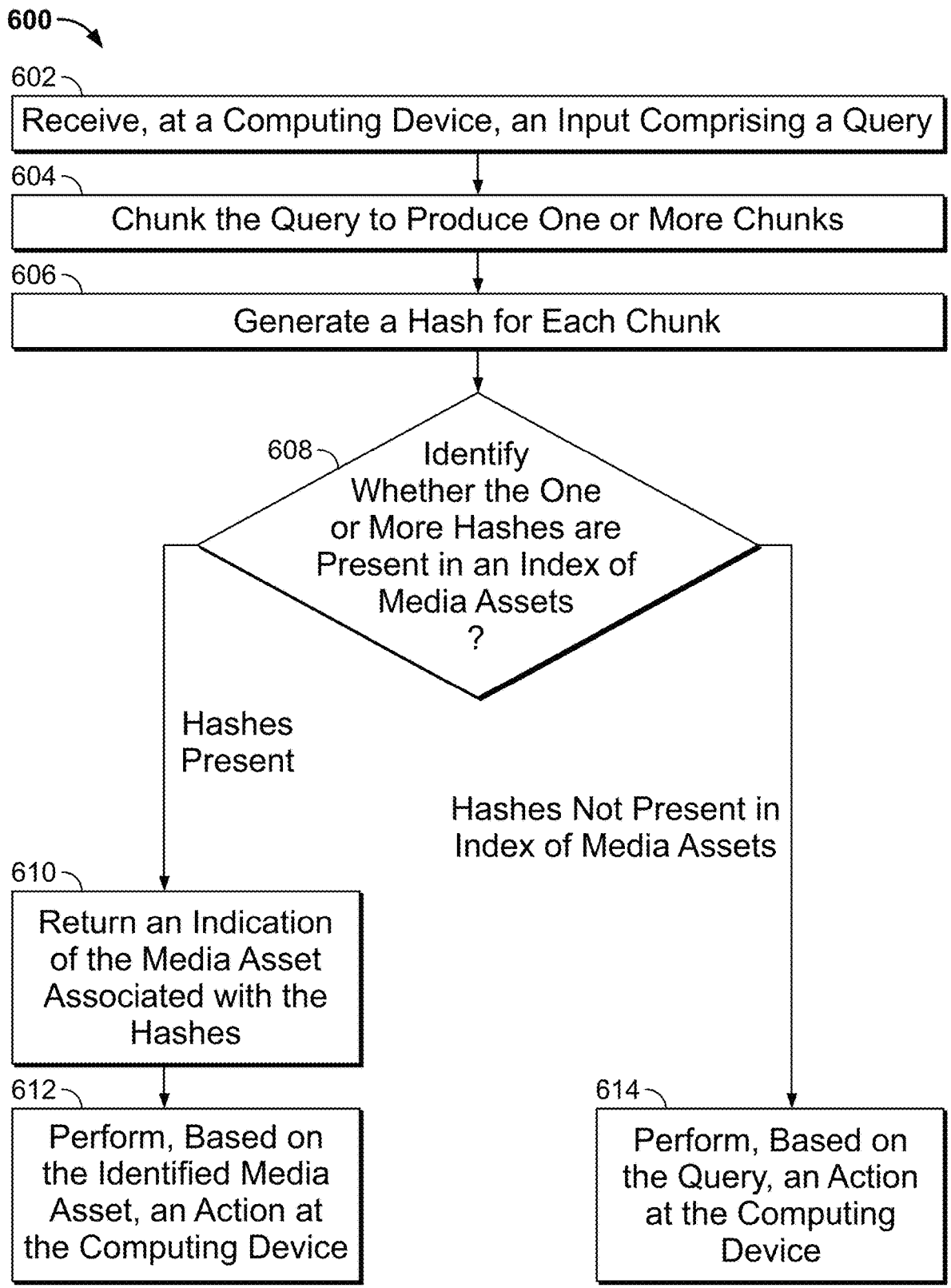
FIG. 6 is a flowchart representing a process for handling a query comprising a media quote, in accordance with some embodiments of the disclosure.

FIG. 6 is a flowchart representing a process for handling a query comprising a media quote, in accordance with some embodiments of the disclosure. Process 600 may be implemented on any aforementioned computing device 102, 202, 302. In addition, one or more actions of process 600 may be incorporated into or combined with one or more actions of any other process or embodiment described herein.

At 602, an input comprising a query is received at a computing device. At 604, the query is chunked to produce one or more chunks. At 606, a hash is generated for each chunk. At 608, it is identified whether the one or more hashes are present in an index of media assets. If the hashes are present, an indication of the media asset associated with the hash is returned 610 and an action is performed at the computing device based on the media asset 612. If the hashes are not present in the index of media assets, then the query does not relate to a media asset, or further information is required from the user. If the query does not relate to a media asset, then the action is related to the query, for example "Mute my phone." If the query does relate to a media asset but, for example, some of the query is intelligible, then the action may comprise asking the user for further information or to repeat the query.

Figure 7:
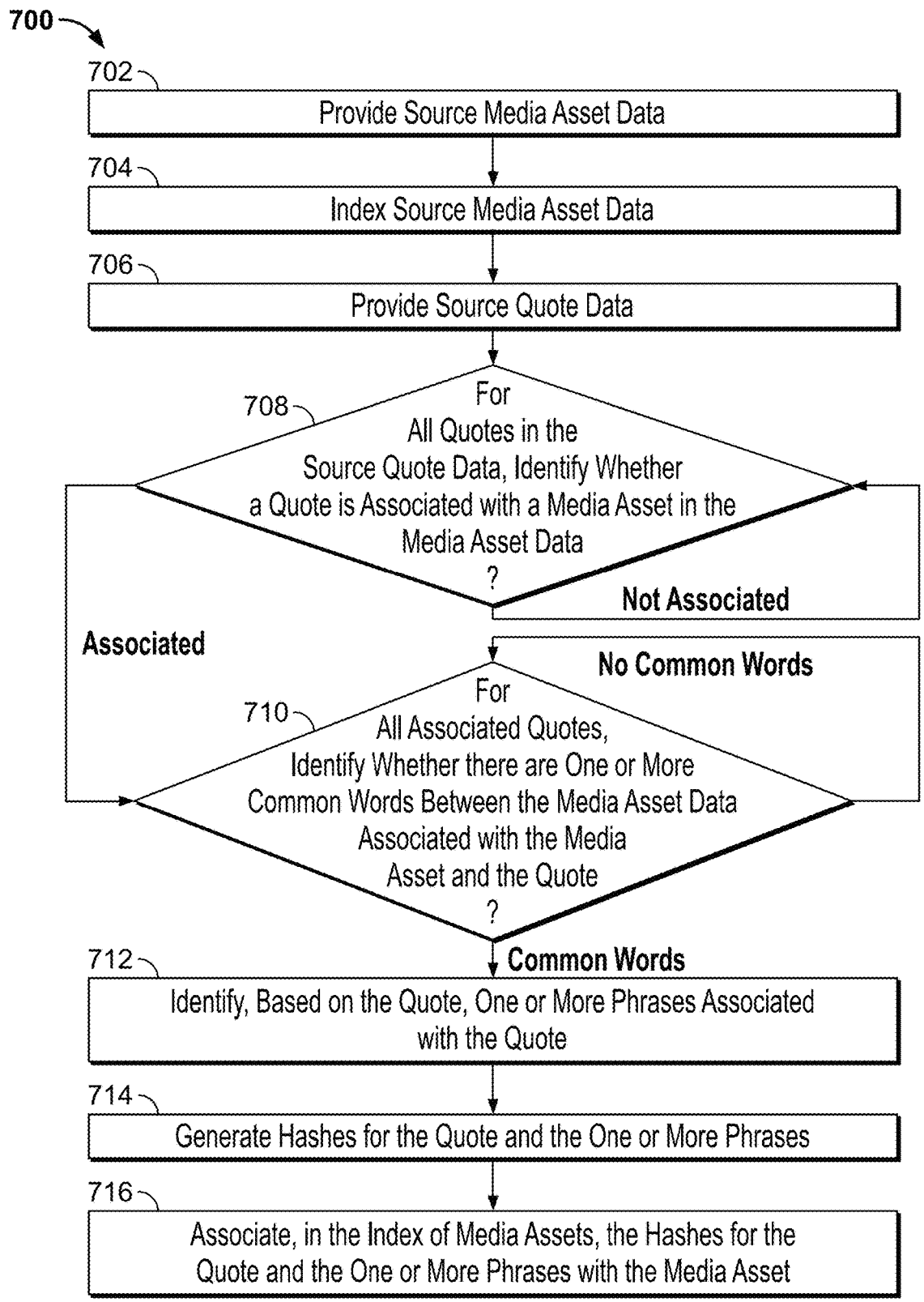
FIG. 7 is a flowchart representing a process for generating an index of media assets, in accordance with some embodiments of the disclosure.

FIG. 7 is a flowchart representing a process for generating an index of media assets, in accordance with some embodiments of the disclosure. Process 700 may be implemented on any computing device. In addition, one or more actions of process 700 may be incorporated into or combined with one or more actions of any other process or embodiment described herein.

At 702, source media asset data is provided. The source media asset data comprises data associated with at least one media asset, for example, titles of movies, songs and/or e-books. At 704, the source media asset data is indexed. At 706, source quote data is provided. The source quote data comprises one or more quotes associated with at least one media asset. The quotes may be phrases from movies, lyrics from songs and/or phrases from e-books. At 708, for all of the quotes in the source quote data, it is identified whether a quote is associated with a media asset in the media asset data. If the quote is not associated with a media asset, then the next quote in the quote data is processed. If a quote is associated with a media asset, then for all associated quotes, it is identified whether there are one or more common words between the media asset data associated with the media asset and the quote 710. If there are no common words, the next quote is processed. If there are common words, then at 712, one or more phrases associated with the quote are identified. At 714, hashes for the quote and the one or more phrases are generated. At 716, the hashes for the quote and the one or more phrases are associated with the media asset in the index of media assets.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a computing device, an input comprising a query, wherein the query comprises a media quote;
   identifying, from the query, a media quote;
   comparing the media quote to a first plurality of media asset titles to identify a second plurality of media asset titles that share one or more common words with the media quote, wherein the comparing comprises:
      identifying whether a hash, based on the query, is present in an index of media assets, wherein the index of media assets is generated by:
         identifying a plurality of quotes, each quote associated with a different media asset title;
         identifying, for each quote in the plurality of quotes, one or more phrases associated with the quote;
         generating hashes for the quote and the one or more phrases; and
         associating, in the index of media assets, the hashes for the quote and the one or more phrases with the media asset; and
      if the hash is present in the index of media assets, returning a title of the media asset associated with the hash;
   identifying a plurality of media assets, each media asset of the plurality of media assets corresponding to a media asset title of the second plurality of media asset titles;
   generating, for output, a plurality of user interface elements, each user interface element associated with a media asset of the plurality of media assets;
   receiving an input associated with one of the plurality of user interface elements; and
   generating, for output at the computing device, the media asset associated with the user interface element.

2. The method of claim 1, wherein the identifying the media quote and the media asset further comprises:
   chunking the query to produce one or more chunks;
   generating a hash for each chunk of the one or more chunks, thereby producing one or more hashes;
   identifying whether the one or more hashes are present in an index of media assets; and
   where the one or more hashes are present in the index of media assets, returning a title of the media asset associated with the one or more hashes.

3. The method of claim 1, wherein the identifying the media quote and the media asset further comprises:
   identifying, based on the identified media quote, one or more phrases;
   determining whether the one or more phrases have one or more phonetic and/or lexical variants; and, if a phrase has a phonetic and/or lexical variant:
      chunking the query and the one or more phonetic and/or lexical variants, thereby producing a plurality of hashes;
      identifying whether identifying whether the one or more hashes are present in an index of media assets; and
      where the one or more hashes are present in the index of media assets, returning a title of the media asset associated with the one or more hashes.

4. The method of claim 2, wherein the chunking is performed via an N-Gram, a Skip gram and/or an Edge gram look up.

5. The method of claim 3, wherein the determining whether the one or more phrases have one or more phonetic and/or lexical variants is performed via a Soundex and/or a Lexical normalization algorithm.

6. The method of claim 1, wherein the input is a second input, the method further comprising:
   receiving, at the computing device, a first input that does not comprise a media quote; and
   outputting, at the computing device, a request for a second input that does comprise a media quote.

7. The method of claim 1, wherein the input is a second input, the method further comprising:
   receiving, at the computing device, a first input that is intelligible; and
   outputting, at the computing device, a request to repeat the first input, wherein the second input comprises the repeated first input.

8. The method of claim 1, wherein:
   the computing device communicates with a server; and
   the computing device receives, from the server, an indication of whether the query comprises a media quote.

9. The method of claim 1, wherein the input is tactile input.

10. The method of claim 1, wherein:
    identifying whether the hash is present in the index of media assets further comprises:
       chunking the query to produce one or more chunks;
       generating a hash for each chunk of the one or more chunks;
    identifying the plurality of quotes further comprises:
       providing source media asset data, wherein the source media asset data comprises a plurality of media asset titles and media assets, each media asset title associated with at least one media asset, the media asset titles comprising one or more words;
       indexing the source media asset data to produce an index of media assets;
       providing source quote data, wherein the source quote data comprises one or more quotes associated with at least one media asset, each quote comprising one or more words;
       for each quote in the source quote data, identifying whether the quote is associated with a media asset in the source media asset data; and
       where a quote is associated with a media asset, identifying whether there are one or more common words between the media asset title associated with the media asset and the quote.

11. A system comprising:
    input/output circuitry configured to:
       receive, at a computing device and via the communication port, an input comprising a query, wherein the query comprises a media quote; and
    processing circuitry configured to:
       identify, from the query, a media quote;
       compare the media quote to a first plurality of media asset titles to identify a second plurality of media asset titles that share one or more common words with the media quote wherein the processing circuitry configured to compare the media quote to a first plurality of media asset titles is configured to:
          identify whether a hash, based on the query, is present in an index of media assets, wherein the index of media assets is generated by:
             identifying a plurality of quotes, each quote associated with a different media asset title;

identifying, for each quote in the plurality of quotes, one or more phrases associated with the quote;
generating hashes for the quote and the one or more phrases; and
associating, in the index of media assets, the hashes for the quote and the one or more phrases with the media asset; and
if the hash is present in the index of media assets, returning a title of the media asset associated with the hash;
identify a plurality of media assets, each media asset of the plurality of media assets corresponding to a media asset title of the second plurality of media asset titles;
generate, for output, a plurality of user interface elements, each user interface element associated with a media asset of the plurality of media assets;
receive an input associated with one of the plurality of user interface elements; and
generate, for output at the computing device, the media asset associated with the user interface element.

12. The system of claim 11, wherein the control processing circuitry configured to identify the media quote and the media asset is further configured to:
chunk the query to produce one or more chunks;
generate a hash for each chunk of the one or more chunks, thereby producing one or more hashes;
identify whether the one or more hashes are present in an index of media assets; and
where the one or more hashes are present in the index of media assets, return title of the media asset associated with the one or more hashes.

13. The system of claim 11, wherein the processing circuitry configured to identify the media quote and the media asset is further configured to:
identify, based on the identified media quote, one or more phrases;
determine whether the one or more phrases have one or more phonetic and/or lexical variants; and, if a phrase has a phonetic and/or lexical variant:
chunk the query and the one or more phonetic and/or lexical variants, thereby producing a plurality of hashes;
identify whether identifying whether the one or more hashes are present in an index of media assets; and
where the one or more hashes are present in the index of media assets, return a title of the media asset associated with the one or more hashes.

14. The system of claim 12, wherein the control-processing circuitry configured to chunk the query is further configured to chunk the query via an N-Gram, a Skip gram and/or an Edge gram look up.

15. The system of claim 13, wherein the control processing circuitry configured to determine whether the one or more phrases have one or more phonetic and/or lexical variants is further configured to determine whether the one or more phrases have one or more phonetic and/or lexical variants via a Soundex and/or a Lexical normalization algorithm.

16. The system of claim 11, wherein the input is a second input, the processing circuitry further configured to:
receive, at the computing device, a first input that does not comprise a media quote; and
output, at the computing device, a request for a second input that does comprise a media quote.

17. The system of claim 11, wherein the input is a second input, the processing circuitry further configured to:
receive, at the computing device, a first input that is intelligible; and
output, at the computing device, a request to repeat the first input, wherein the second input comprises the repeated first input.

18. The system of claim 11, wherein the processing circuitry is further configured to:
enable the computing device to communicate with a server; and
enable the computing device to receive, from the server, an indication of whether the query comprises a media quote.

19. The system of claim 11, wherein the processing circuitry configured to receive the input is further configured to receive tactile input.

20. The system of claim 11, wherein:
the processing circuitry configured to identify whether the hash is present in the index of media assets is further configured to:
chunk the query to produce one or more chunks;
generate a hash for each chunk of the one or more chunks;
the processing circuitry configured to identify the plurality of quotes is further configured to:
provide source media asset data, wherein the source media asset data comprises a plurality of media asset titles and media assets, each media asset title associated with at least one media asset, the media asset titles comprising one or more words;
index the source media asset data to produce an index of media assets;
provide source quote data, wherein the source quote data comprises one or more quotes associated with at least one media asset, each quote comprising one or more words;
for each quote in the source quote data, identify whether the quote is associated with a media asset in the source media asset data; and
where a quote is associated with a media asset, identify whether there are one or more common words between the media asset title associated with the media asset and the quote.

* * * * *

UNITED STATES PATENT AND TRADEMARK OFFICE
CERTIFICATE OF CORRECTION

PATENT NO. : 11,785,288 B2
APPLICATION NO. : 17/675165
DATED : October 10, 2023
INVENTOR(S) : Jeffry Copps Robert Jose Page 1 of 1

It is certified that error appears in the above-identified patent and that said Letters Patent is hereby corrected as shown below:

In the Claims

In Claim 12, Column 11, Line 23, please delete "control".

In Claim 14, Column 11, Line 50, please delete "control-".

In Claim 15, Column 11, Line 54, please delete "control".

Signed and Sealed this
Twenty-eighth Day of November, 2023

Katherine Kelly Vidal
*Director of the United States Patent and Trademark Office*